Sept. 28, 1943. N. L. ETTEN 2,330,480
WRINGER ROLL STOP
Filed Nov. 27, 1939 3 Sheets-Sheet 2
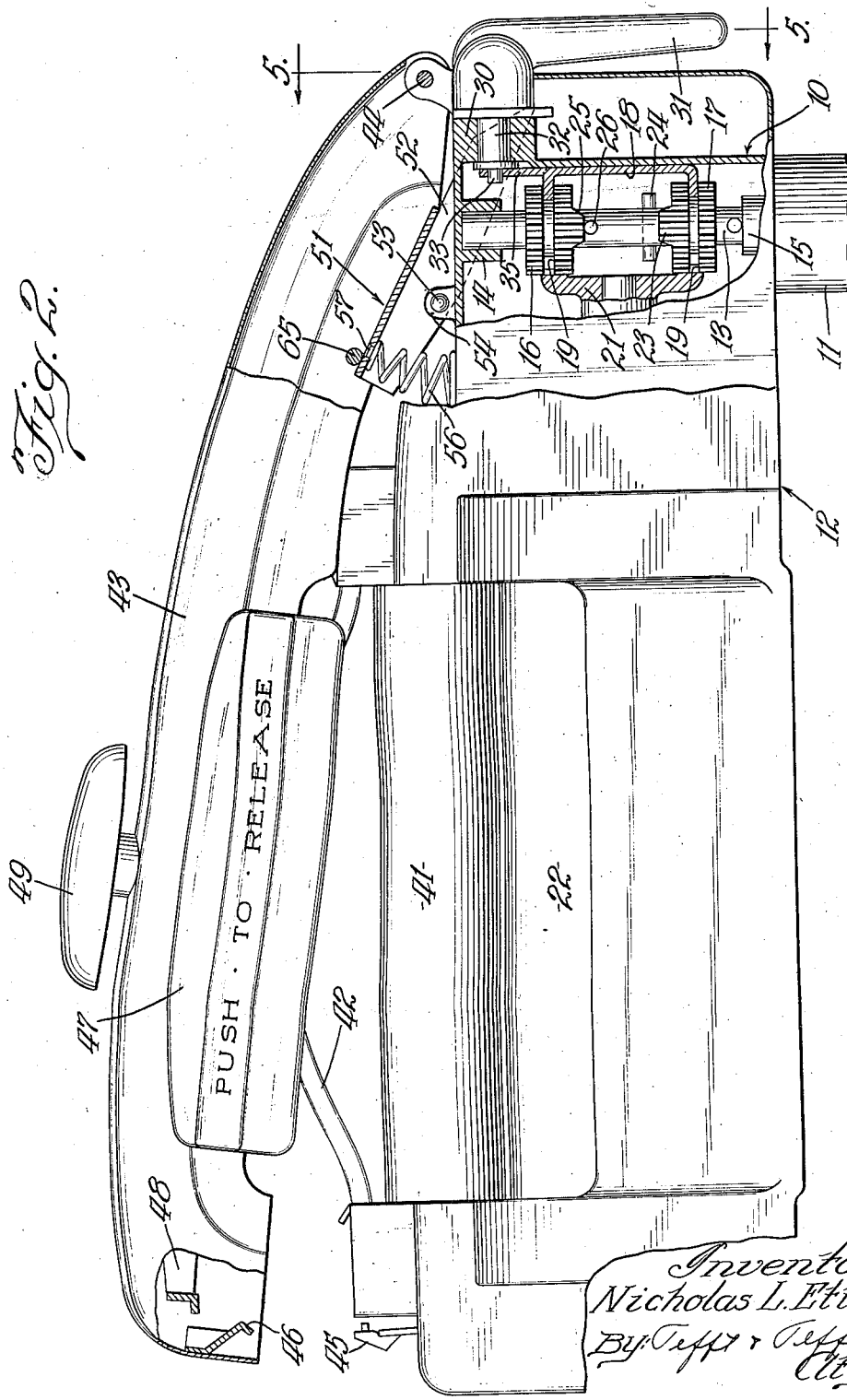
Inventor:
Nicholas L. Etten Patented Sept. 28, 1943

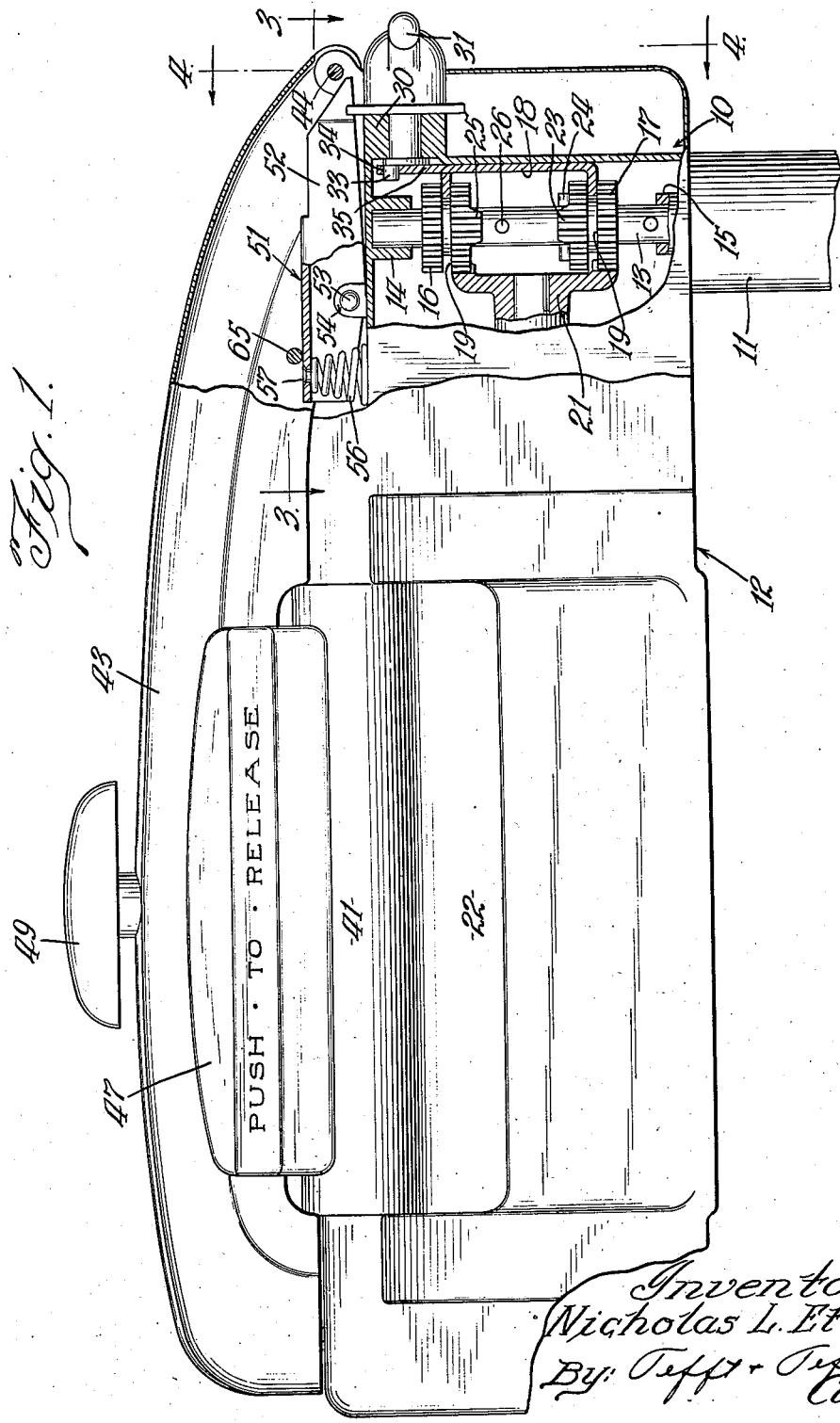

2,330,480

UNITED STATES PATENT OFFICE 2,330,480

WRINGER ROLL STOP

Nicholas L. Etten, Waterloo, Iowa

Application November 27, 1939, Serial No. 306,307

7 Claims. (Cl. 68—253)

This invention relates to washing machine wringers and more particularly to a new and novel roll stop mechanism whereby the rotary movement of the rolls is automatically interrupted at any time that the emergency pressure release mechanism of the wringer is actuated.

A principal object of the invention is to provide a roll stop mechanism responsive to the emergency pressure release of the wringer, which will be effective to directly actuate the gear shift lever customarily provided in present-day power operated wringers.

A further object of the invention is to provide a roll stop mechanism adapted to actuate the manually operable gear shift of the wringer in order to urge the gear shift from either the forward or reverse positions to an intermediate inoperative or neutral position.

A further object of the invention is to provide such a roll stop mechanism with means to lock the manually operable gear shift lever in neutral position to the end that rotary movement of the rolls cannot be accomplished until the pressure mechanism of the wringer has been reset.

Another important object of the invention is to provide a roll stop mechanism wherein a manually operable gear shift lever may be spring-urged into an intermediate neutral position between a forward position on one side and reverse position on the other, and automatically limited in its movement in order that the inertia of the lever itself or of the associated gear structures cannot throw the mechanism into engagement beyond the neutral position.

Another important object of the invention is to provide a spring-operated roll stop mechanism wherein the roll stop spring may be energized by a relatively long lever mechanism, as, for example, by the top frame of the wringer, to the end that the spring will be entirely independent of the normal operation of the gear shift lever and will not be effective to increase the amount of manual effort necessary to operate this lever.

These objects are accomplished in the present invention by providing a cam or positioning plate on the shaft of the wringer gear shift and providing a roll stop member which is pivotally mounted external of the gear case of the wringer and which is adapted to directly engage the positioning plate to swing the wringer gear shift lever to a neutral position. The roll stop member is provided with a spring tending to move the parts into neutral position at all times, but the top frame of the wringer is provided with a cross-pin positioned to hold the roll stop spring in compressed position during the normal operation of the wringer. The arrangement is such, however, that whenever the emergency pressure release mechanism of the wringer is operated and the separable top frame is allowed to fly upwardly the roll stop spring is released and the spring will then act to pivot the roll stop member against the positioning plate affixed to the gear shift shaft, and swing the gear shift from either the forward or reversing operating position to an intermediate neutral position.

Referring now more particularly to the drawings—

Fig. 2 is a view similar to Fig. 1, in which the several parts of the wringer structure are shown in released position;

Fig. 3 is a detail plan section taken substantially on the plane of the line 3—3 of Fig. 1;

Figure 1:
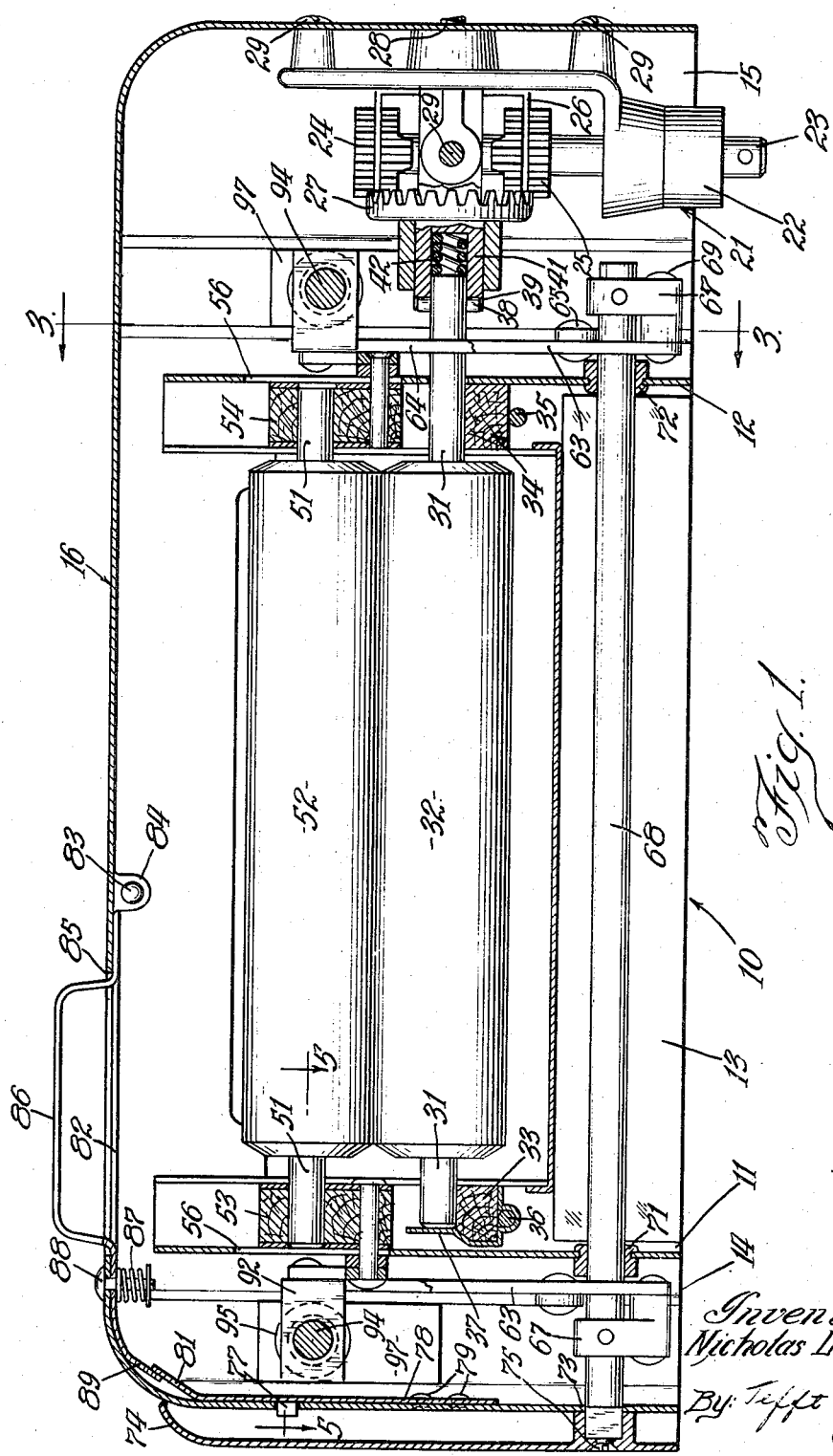
Fig. 1 is a front elevation of a preferred embodiment of the present invention, showing certain parts of the wringer housing broken away to more clearly disclose the operating mechanism.

Fig. 4 is a detail sectional view taken substantially on the plane of the line 4—4 in Fig. 1, illustrating the wringer gear shift lever and associated roll stop mechanisms in normal operating position; and Fig. 5 is a detail sectional view taken substantially on the plane of the line 5—5 in Fig. 2, and illustrating the wringer gear shift lever and associated roll stop mechanisms in the position these parts assume when the emergency pressure release mechanism of the wringer is actuated.

The wringer structure comprises in general a gear case 10 mounted at the upper end of a wringer mounting sleeve 11 adapted to be pivotally affixed to cooperating wringer mounting mechanisms of the nature customarily provided on present day domestic washing machines.

The wringer frame 12 is secured to this gear case 10 in any desirable manner, but since such an arrangement is well known and customarily used in the art, it will not be described in greater detail in this application.

The power driving mechanism for the wringer comprises a vertical driving shaft 13 which may be driven by any suitable power source, as, for example, by the motor of a washing machine on which the entire wringer structure is mounted. The shaft 13 is suitably journaled in top and bottom bearings 14 and 15 in the gear case 10 and carries a pair of reversing gears 16 and 17 interconnected by a shifting yoke 18 adapted to operate in grooves 19 formed in the gears 16 and cation of this force at a moment when the gears may be shifted easily may result in imparting sufficient velocity to the gear shift lever and to the gears themselves to cause these members to "overthrow" or move beyond the neutral position and re-engage to establish a rotary driving connection in the opposite direction. On the other hand, a light spring is unsatisfactory, since it might operate the roll stop mechanism only if the rolls could be moved easily and in the event that the resistance to the gear shifting movement was unusually great, the spring would be unable to force the gears into neutral position.

These disadvantages of the prior art structures have been overcome in the present invention by providing a relatively heavy spring capable of exerting sufficient force to operate the gear shift under the most adverse circumstances ever encountered in actual use; and by providing a powerful roll stop spring coupled with limiting devices adapted to lock the gear shift lever and the gears in neutral position and thus prevent any possibility of accidental overthrow due to the inertia and velocity of the shift lever or the gears. The structure provided to accomplish this will be easily understood by reference to Fig. 5. Here it will be seen that the end portions of the operating arms 52 lie in closely fitting relationship with the parallel side walls 58 and 59 of the positioning plate 55. Thus, whenever the roll stop 51 is pivoted about the rivet 53, these end portions of the arms 52 move downwardly along the opposed parallel surfaces 58 and 59 until the arms 52 strike the lowermost angularly extending portions 61 and 62 of the positioning plate 55. At this time the gear shift lever 31 is positively locked in vertical neutral position and since this lever is directly connected to the reversing gears themselves, these gears 16 and 17 will be positively held in neutral position until the roll stop arms 52 are lifted to release the gear shift lever 31.

In the structure illustrated, the roll stop mechanism is automatically rendered inoperative whenever the top frame 43 is moved downwardly into latching engagement with the lower frame 12. To accomplish this result a cross pin 65 is riveted between the opposed walls of the top frame 43 and is positioned so that it will bear against the left-hand end of the roll stop lever 51 to compress the coiled compression spring 56 and raise the operating arms 52 upwardly as the top frame 43 is moved downwardly to operating position. At this point it should be noted that the long leverage afforded by the top frame 43 operating on the rivet 44 as a fulcrum, will enable the operator to compress a very heavy roll stop spring without noticeable physical effort and will thus permit convenient use of springs sufficiently heavy to be absolutely dependable in operation which have heretofore been objectionable in certain prior art structures since they were burdensome and difficult of operation, particularly in structures so designed that the roll stop spring was reset or energized by movement of the gear shift lever; or, as a matter of fact, by the movement of any lever of low mechanical advantage.

From the above description it is believed apparent that the preferred embodiment of the invention illustrated in the drawings constitutes a true advance from the prior art structures heretofore used in that a very simple and absolutely dependable mechanism has been provided to accomplish a result heretofore accomplished only by comparatively complicated and undependable structures.

While I have shown and described the present preferred embodiment of the present invention in compliance with the patent statutes, I am aware that it is capable of numerous alterations and modifications without departing from the invention spirit, and I, therefore, do not wish to be limited except as by the appended claims.

I claim:

1. In a wringer, a frame, a pressure spring, a plurality of pressure rolls, a pressure release for said rolls comprising a separable top frame latched to said wringer frame, power-operated driving means for said rolls comprising a gear housing including a gear assembly having forward, neutral, and reverse operating positions and a gear shift lever movable between said positions, a roll stop member pivotally mounted on the exterior of said gear housing, an operating cam affixed to said shift lever externally of said gear housing and adapted to be engaged by said roll stop member and moved to neutral position by said roll-stop member, a spring to actuate said roll-stop member, and a restraining stop affixed to said separable top frame of the wringer to secure said spring in inactive position.

2. In a wringer having a lower frame with rolls rotatable therein, a top frame hinged at one end to the lower frame and retained by a latch at the opposite end, releasable pressure means for the rolls including means to release the top frame latch, driving means for the rolls, and shifting means for controlling the forward and reverse driving of the rolls and for non-operation of the rolls when in neutral position; the combination of a roll-stop device comprising a control lever connected to the shifting means, and a spring actuated lever connected to said control lever and movable with the releasable pressure means when released to move said control lever into neutral position, said spring actuated lever being cocked by hinging action of the top frame.

3. In a wringer having a lower frame with rolls rotatable therein, at top frame hinged at one end to the lower frame and retained by a latch at the opposite end, releasable pressure means including means to release the top frame latch, driving means for the rolls, and shifting means for controlling the forward and reverse driving of the rolls and for non-operation of the rolls when in neutral position; the combination of a roll-stop device comprising a control lever connected to the shifting means, and a spring actuated lever connected to said control lever and movable with said top frame part when released to move said control lever into neutral position, said spring-actuated lever being cocked by hinging action of the top frame.

4. In a wringer having a lower frame with rolls rotatable therein, a top frame hinged at one end to the lower frame and retained by a latch at the opposite end, releasable pressure means for the rolls including means to release the top frame latch, driving means for the rolls, and shifting means for controlling the forward and reverse driving of the rolls and for non-operation of the rolls when in neutral position; the combination of a roll-stop device comprising a control lever connected to the shifting means and having parallel sides, and a spring actuated lever having arms engageable with the parallel sides of said control lever and movable with the releasable pressure means when released to move said control lever into neutral position, said spring-actuated lever being cocked by hinging action of the top frame.

5. In a wringer having a lower frame with rolls rotatable therein, a top frame hinged at one end to the lower frame and retained by a latch at the opposite end, releasable pressure means for the rolls including means to release the top frame latch, driving means for the rolls, shifting means for controlling the forward and reverse driving of the rolls and for non-operation of the rolls when in neutral position, and a housing for said driving means; the combination of a roll-stop device comprising a control lever connected to the shifting means and having parallel sides, and a spring actuated lever pivotally mounted on said housing and connected to said control lever and movable with the releasable pressure means when released to move said control lever into neutral position, said spring-actuated lever being cocked by hinging action of the top frame.

6. In a wringer having a lower frame with rolls rotatable therein, a top frame hinged at one end to the lower frame and retained by a latch at the opposite end, releasable pressure means for the rolls including means to release the top frame latch, driving means for the rolls, shifting means for controlling the forward and reverse driving of the rolls and for non-operation of the rolls when in neutral position, and a housing for said driving means; the combination of a roll-stop device comprising a control lever connected to the shifting means and having parallel sides, and a spring actuated lever pivotally mounted on said housing having arms engageable with the parallel sides of said control lever and movable with the releasable pressure means when released to move said control lever into neutral position, said spring-actuated lever being cocked by hinging action of the top frame.

7. In a wringer, a lower frame, coacting pressure rolls, gear head driving means for the rolls, gear head driving control means for forward, reverse and stop, a top frame hinged at one end to the lower frame with latch pressure retaining means at the opposite end, a stop lever pivotally mounted adjacent the hinged end of the top frame and operatively associated with the gear head control, a powerful spring to actuate the stop lever, and high advantage lever means including the hinging of the top frame to cock the stop lever spring, whereby powerful roll stop means is provided by hinging the top frame to latched position on the lower frame.

NICHOLAS L. ETTEN.

Sept. 28, 1943. N. L. ETTEN 2,330,481
CONSTANT PRESSURE WRINGER
Filed Nov. 24, 1939 5 Sheets-Sheet 1

Inventor:
Nicholas L. Etten
By Tefft & Tefft
Attys.